Dec. 31, 1968
R. H. HALVORSEN
3,418,743
FISH LURE WITH RETRACTABLE HOOKS
Filed May 2, 1967
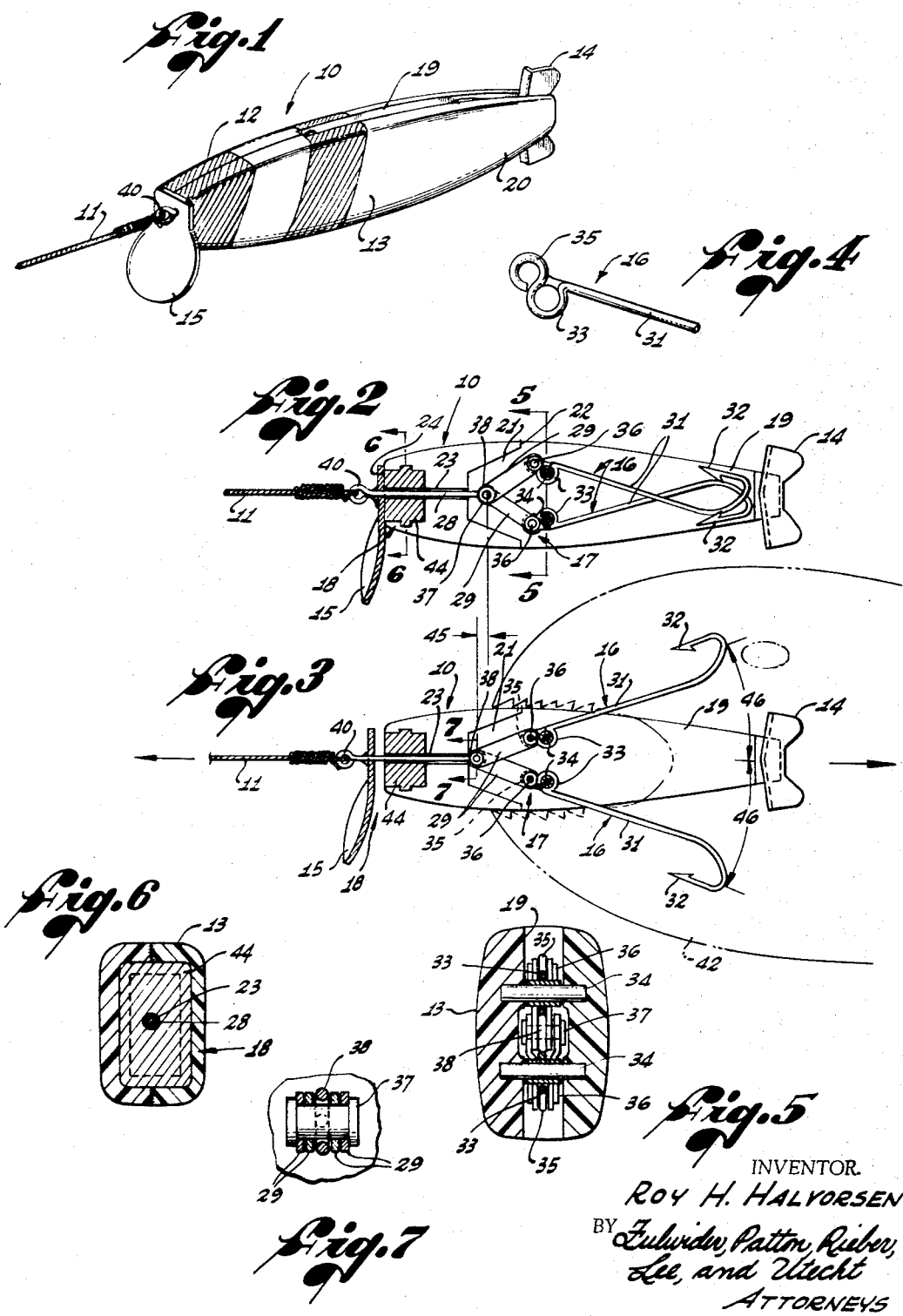
INVENTOR.
ROY H. HALVORSEN
BY Fulwider, Patton, Rieber,
Lee, and Utecht
ATTORNEYS

United States Patent Office 3,418,743
Patented Dec. 31, 1968

3,418,743
FISH LURE WITH RETRACTABLE HOOKS
Roy H. Halvorsen, 3112 Cardiff Ave.,
Los Angeles, Calif. 90034
Filed May 2, 1967, Ser. No. 635,427
9 Claims. (Cl. 43—35)

ABSTRACT OF THE DISCLOSURE

A fish lure with normally retracted hooks which are extended when a fish strikes the body of the lure. A hook-extending mechanism in the lure body is normally biased with the hooks in the retracted position by a magnetic attractive force. When the fish strikes, the magnetic force is overcome and the hooks are extended, and if the fish should not be caught, the magnetic force operates on the hook-extending mechanism to return the hooks to the retracted position.

Background of the invention

Applicant's invention relates generally to fish lures and more particularly to fish lures with normally retracted hooks which extend from the body of the lure when struck by a fish.

Fishermen have long employed artificial fish lures or baits, commonly known as "plugs," as a means to attract and catch fish. The common form of these fish lures is a wooden or plastic body of a shape and color attractive to fish and a number of hooks attached to the body of the lure. The hooks become embedded in the fish's mouth when it "strikes" the lure. Such lures are ordinarily "cast" away from the fisherman and then reeled back toward the fisherman, thereby moving the lure through the water to attract fish in the area.

The natural habitat of many of the desirable sport fish is in and around weeds and other water plants, and the trailing hooks of an ordinary fish lure often become entangled in the weeds as the lure is pulled through them. Fishermen have long sought a fish lure which would not become entangled in the weeds as the lure was slowly moved through them, and various types of fish lures have appeared in which weed guards are provided. In others, the hooks are normally contained within the lure body and are extended when a fish creates a drag on the lure by closing its mouth over the body of the lure. For the most part, such prior lures with extensible-retractable hooks have been prone to malfunction. Either the force biasing the hooks to their retracted position was insufficient to prevent them from being inadvertently extended, as when the body strikes weeds, or so great as to prevent full extension in response to a "light" strike by the fish.

Summary of the invention

To solve the particular problems described above in using a fish lure with hidden or retractable hooks, applicant provides a fish lure with a hook-extending mechanism which employs a magnetic means to maintain the hooks nested within the body of the lure when encountering the normal drag forces as the lure is pulled through the water. The variable nature of the magnetic force allows positive and quick extension of the hooks when the drag force on the body of the lure is increased even slightly by a striking fish. Should the fish not be caught by the hooks, the hooks are retracted within the body of the fish lure to prevent the possibility of entanglement in nearby weeds or other water plants.

The use of magnetic means is of significant advantage in that the force holding the hooks in their retracted position is greater than that acting to return the hooks to that position, once they have moved from it. This serves to prevent inadvertent extension of the hooks, yet insures that when the fish strikes, they do extend. This type of action also enables the means for actuating the hooks to have a very short stroke, so that the hooks are fully extended, even in response to a "light" strike by the fish. Moreover, such magnetic means are inherently reliable and trouble-free in operation.

Description of the drawing

FIGURE 1 is a perspective view of the present invention attached to a fish line, the hooks being retracted within the body of the lure;

FIGURE 2 is a sectional side view of the lure, the hooks being shown in retracted position;

FIGURE 3 is a sectional side view of the lure, the hooks being shown in extended position with a striking fish shown in phantom;

FIGURE 4 is a view on an enlarged scale of a portion of the hook employed in the lure;

FIGURES 5 and 6 are enlarged sectional views taken along the line 5—5 and 6—6, respectively in FIGURE 2; and FIGURE 7 is a fragmentary sectional view on an enlarged scale taken along the line 7—7 in FIGURE 3.

Description of the preferred embodiment

Referring to FIGURE 1 of the drawing, the fish lure is generally indicated by the numeral 10 and is adapted to be pulled through the water by means of a fish line 11 secured to its forward end 12. The size, shape and color of the lure is subject to considerable variation and is determined principally by what is believed to be attractive to fish. Thus, the shape of the lure 10 shown in the drawing is similar to that of other lures of its type and has a multicolored elongated body 13 which terminates in a tailfin 14 and has a spoon 15 on the forward end to aid in simulating a swimming bait fish as the lure is pulled through the water. A lure with this shape moves easily through the water and through weeds or other water plants without snagging.

The lure 10 further includes a pair of hooks 16 which are adapted to move into and out of protective relation with respect to the body 13. A hook-extending mechanism 17 is connected to the hooks and actuates them into and out of such protective relation. Magnetic means 18 which cooperates with the hook-extending mechanism and the body normally maintains the hooks in the protective relationship and serves to retract them following extension in the event the fish is not hooked.

For the purpose of mounting the hooks 16 in protective relationship and housing the hook-extending mechanism 17, the lure 10 of the invention has an elongated vertical slot 19 through a substantial portion of the rearward end 20 of the lure body 13. As best seen in FIGURES 2 and 3, there is a notch 21 in the front end 22 of the slot 19 which extends forwardly into the forward end 12 of the body 13 of the fish lure 10. A channel 23 of circular cross section extends between the nose 24 of the body 13 and the notch 21.

The slot 19, notch 21 and channel 23 are adapted to receive the hooks 16 and the hook-extending mechanism 17, and their particular size and configuration is determined by the requirements of the hooks and mechanism. Considerable variation is then possible in these portions of the body 13 of the lure 10.

Each of the pivotal hooks 16 has a shank 31 which terminates at one end in a barb portion 32 and terminates at the other end in a pivoting eye 33, which is best shown in FIGURE 4. In the embodiment of a pivotal hook 16 shown, the shank 31 extends tangentially from the pivoting eye 33, but it is to be noted that other configurations are possible. The pivoting eye 33 of two hooks 16 employed in the lure 10 shown are adapted to rotate about a pair of pins 34 set in spaced relationship between the walls of the slot 19, as shown in FIGURE 5. The position of the pins 34 within the slot 19 is dependent upon the configuration of the particular hook-extending mechanism 17 used and, in general, the desirable position would be one in which the hooks 16 were entirely disposed within the slot 19. It is also preferable that the hooks 16 be arranged in the slot 19 so that the barb portion 32 of each hook will extend outwardly from opposite openings of the slot. It should be noted that while a fish lure 10 with two extendable hooks 16 is described, a lure with any number of hooks could be similarly constructed.

An offset eye 35 is also tangentially attached to the pivoting eye 33, as shown in FIGURE 4. The distance between the centers of the pivoting eye 33 and the offset eye 35 form a crank arm which is employed to pivot a hook 26 about each pin 34.

The hook-extending mechanism 17 comprises mainly an actuating shaft 28 and pairs of link bars 29 between the hooks 16 and shaft. Ends of each pair of link bars 29 are pivotally attached to the offset eyes 35 by crank pins 36 with individual bars of each pair arranged on either side of the offset eye 35. The opposite ends of the link bars 29 are pivotally joined by means of a link pin 37 to a link eye 38 on the rearward end of the actuating shaft 28 which slidably moves within the channel 23 (FIGURE 7). The forward end of the actuating shaft 28 fixedly carries the spoon 15 and the end terminates in a pull eye 40 to which the fish line 11 is attached. The size and disposition of the members of the hook-extending mechanism 17 and the angle of the crank arm with respect to the shank 31 of the pivoting hooks 16 are such that, when the flat portion of the spoon 15 is immediately adjacent the nose 24 of the fish lure 10, the hooks 16 are entirely disposed within the slot 19 of the fish lure. When the actuating shaft 28 moves forwardly through the channel 23, the forward movement is communicated to the crank arms of the pivoting hooks 16 by the link bars 29 and each of the hooks is pivoted in opposite directions about its respective pivoting eye 33. The shanks 31 and carried barb portions 32 of the pivoting hooks 26 are then angularly rotated out of opposite openings of the slot 19 and are thereby extended from the body 13 of the fish lure 10.

It is to be noted that the hooks 16 are normally retracted in the slot 19 and the spoon 15 is adjacent the nose 24 of the fish lure 10. When a fish 42 strikes the lure 10 and closes its mouth over the body 13 of the lure, the additional drag on the body of the lure results in relative forward movement of the actuating shaft 28 within the channel 23 with respect to the body and the hooks 16 are extended from the slot 19 and are then in position to hook the fish.

To counterbalance the normal reaction force between the body 13 of the lure 10 and the extending mechanism 17 due to the drag created as the lure 10 is drawn through the water by the fish line 11, the spoon 15 is made of a magnetically attractable material and the magnetic means 18 comprises a magnet 44 which is preferably made of a magnetic material which will not deteriorate in water. The magnet 44 is disposed in the nose 24 of the fish lure 10, as shown in FIGURE 6. The channel 23 extends through the magnet 44 and the actuating shaft 28 is preferably made of a non-magnetic material to prevent its being attracted by the portion of the channel passing through the magnet. In its position in the nose 24, the magnet 44 normally attracts the spoon 15 and maintains it immediately adjacent the nose of the lure 10. The hooks 16 are then, in turn, biased in retracted position within the slot 19. The magnetically attractive bias force between the magnet 44 and the spoon 15 is sufficient to counteract the drag on the body 13 of the lure 10 as it is drawn through the water, but is not so great as to overcome the drag produced by a striking fish.

In normal operation then, the lure 10 is pulled through the water by the fish line 11 and the magnetic bias force maintains the spoon 15 immediately adjacent the nose 24 of the lure. The hooks 16 are then retracted within the slot 19 and cannot become entangled in any weeds or other water plants which may be in the vicinity. The lure 10 is also more streamlined and moves through the water more easily than if the hooks 16 were extended. When a fish strikes the lure 10, the increased drag force on the body 13 of the lure overcomes the bias force between the magnet 44 and the spoon 15 and the actuating shaft 28 moves forwardly in the channel 23 actuating the hook-extending mechanism 17 to extend the hooks 16.

If the fish, for some reason, should not be hooked, the magnetic attractive force between the magnet 44 and the spoon 15 in the forward position is again sufficient to overcome the water drag on the body 13 of the lure 10, and the spoon 15 is attracted to the nose 24 which, in turn, causes the hooks 16 to retract, resetting the lure for another strike.

It is to be noted that the use of magnetic means 18 to maintain the hooks 16 in the retracted position and to reset the lure 10 if the striking fish is not caught, has a distinct advantage over lures which employ springs. Spring forces normally exert a progressively increasing force over the length of travel employed in a fish lure, and the drag force supplied by a striking fish must be sustained at a level greater than that required initially to commence hook actuation in order to cause full extension of the hooks. On the other hand, the magnetic attractive forces employed in the present fish lure 10 materially decrease as the distance between the magnet 44 and the spoon 15 increases. This effectively creates a "snap action" type of operation so that a lesser force is required to maintain the hooks in an extended position than the force required to initially extend the hooks. A relatively "light" strike by a fish, then, will usually be sufficient to initially move the spoon 15 away from the magnet 44 and the decreasing force insures complete extension of the hooks 16. On the other hand, inadvertent extension of the hooks is prevented.

The use of magnetic means with its decreasing biasing force as the spoon 15 moves away from the magnet 44 also allows the use of a very short travel of the actuating shaft 28 in order to fully extend the hooks 16. This is illustrated for the fish lure as shown by the short distance traveled by the actuating shaft 28 (numeral 45 of FIGURE 3) and the relatively long resulting distance traveled by the barb portions 32 of the hooks 16 (numeral 46 of FIGURE 3). The small relative movement between the spoon 15 and the magnet 44 aids in insuring complete extension of the hooks 16 even for "light" strikes by a fish.

While a preferred embodiment of the invention has been described in detail, it will be understood that modifications in design and construction can be made without departing from the spirit and scope of the invention.

I claim:

1. A fish lure comprising:
   a body;
   a hook mounted on said body and movable into and out of protective relation with said body;
   hook-extending means on said body and including a rod member connected to said hook for so moving the latter; and
   magnetic biasing means exerting a biasing force to urge said hook continually into said protective relation, said magnetic biasing means yieldably permitting movement of said hook out of said relation, with the biasing force being substantially less when said hook is out of said relation than when it is in said relation.

2. A fish lure as defined in claim 1, wherein said rod member includes actuating means adapted for attachment to a line and movable toward and away from said body as said hook moves into and out of said protective relation; and wherein said magnetic biasing means urges said actuating means toward said body, with the force so urging the same when said hook is in said protective relation being approximately equal to but greater than the drag force on said body as said lure is pulled through the water by the line.

3. A fish lure comprising:
a body;
a hook mounted on said body and movable between a first position wherein said hook is disposed within said body and a second position wherein said hook is extended therefrom;
hook-extending means on said body and including a rod member connected to said hook for so moving the latter; and
biasing means, including magnetic means on one of said hook-extending means and said body and magnetically attractable means on the other thereof, exerting a biasing force for yieldably holding said hook in said first position.

4. A fish lure as defined in claim 3, wherein said magnetic means comprises a permanent magnet mounted on said body at one end thereof, and wherein said magnetically attractable means comprises a spoon secured to said hook-extending means and movable therewith toward and away from said magnet.

5. A fish lure as defined in claim 4, wherein said spoon moves between a first position immediately adjacent said magnet, corresponding to said first position of said hook, and a second position spaced from said magnet, corresponding to said second position of said hook.

6. A fish lure as defined in claim 5, wherein said hook has a crank portion and a barb portion, and wherein the movement of said barb portion as said hook moves between its first and second positions is greater than the movement of said spoon as it moves between its first and second positions.

7. A fish lure to be attached to and pulled by a fish line through the water, comprising:
a body having forward and rearward ends and an elongated slot in the rearward end thereof and a channel communicating between said forward end and said slot;
a hook having a crank portion and a barb portion, said hook being pivotally mounted on said body and movable between a first position wherein said barb portion is entirely within said slot and a second position wherein said barb portion extends from said slot;
a linkage pivotally connected to said crank portion of said hook;
shaft means slidably disposed within said channel and pivotally connected at one end thereof to said linkage and adapted to be connected to a fish line at the opposite end thereof, said barb portion of said hook being pivoted to said second position in response to relative forward movement of said shaft means with respect to said body;
magnetically attractable means attached to said shaft means at said forward end of said body; and
magnetic means disposed in said forward end of said body for attracting said magnetically attractable means immediately adjacent said magnetic means, said magnetic means exerting a force yieldably holding said shaft means against relative forward movement with respect to said body.

8. A fish lure as defined in claim 7, including a plurality of hooks pivotally mounted on said body, each adapted to pivot between said first position and said second position; and
a plurality of linkages each pivotally connected to its respective hook and to said shaft.

9. A fish lure as defined in claim 7, wherein said linkage includes means responsive to a given movement of said shaft means for producing a substantially larger movement of said barb portion of said hook.

References Cited

UNITED STATES PATENTS

| | | | |
|---|---|---|---|
| 2,543,501 | 2/1951 | Kleppen et al. | 43—35 |
| 2,871,608 | 2/1959 | Fisher | 43—35 |

WARNER H. CAMP, *Primary Examiner.*

U.S. Cl. X.R.

43—36, 37